United States Patent Office 3,478,460
Patented Nov. 18, 1969

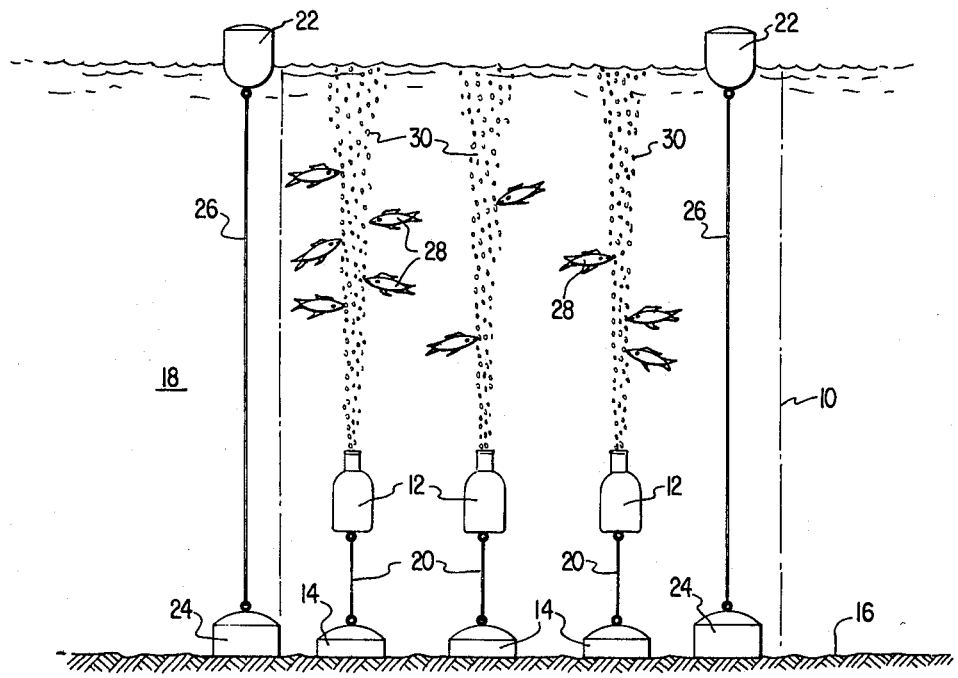
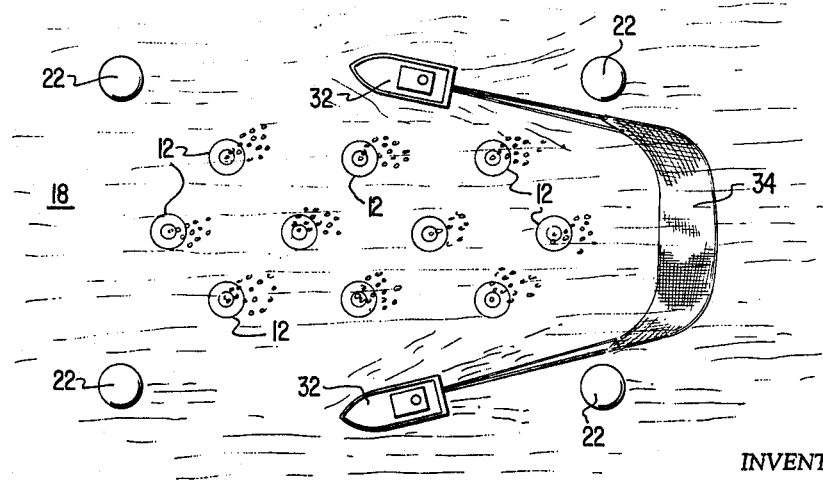

3,478,460
METHOD OF ATTRACTING AND NETTING FISH
Harry E. Kimble, 2109 Juniper Road, Knoxville, Tenn. 37900, and Paul W. Reinhardt, Rte. 3, Box 92A, Kingston, Tenn. 37763
Filed Nov. 20, 1967, Ser. No. 684,429
Int. Cl. A01k *79/00, 75/00*
U.S. Cl. 43—4.5
4 Claims

ABSTRACT OF THE DISCLOSURE

A method of attracting and netting fish comprising the steps of oxygenating a zone or volume of water by placing a plurality of oxygen generators therein to attract fish thereinto and, thereafter, netting the fish attracted to the oxygenated zone.

Cross reference to related application

The oxygen generator disclosed and claimed in copending application Ser. No. 674,316 filed Oct. 10, 1967, is particularly well suited for oxygenating a zone or volume of water as hereinafter described in connection with the novel method of fishing herein disclosed.

Background of the invention

This invention relates to a method of fishing which is related to patents of the type classified in the U.S. Patent Office in Class 43, Subclass 4.5, and, more specifically, to a method of attracting fish into a given zone or volume of water whereby the same may be netted by passing a net through the zone.

Prior attempts to collect or "herd" a large number of fish into a given zone of water whereby the same may be netted have, for the most part, involved some method of scaring the fish. There are many disadvantages to this method of fishing of which one of the more apparent is that the fish must be located before they can be driven into a netting zone. Another disadvantage in attempting to "herd" the fish to a desired zone is that not only do many of them escape the net but, more importantly, the practical range within which such a method may be practiced is extremely limited and must be repeated many times to obtain a full catch.

Another method of fishing that is currently in use involves the use of sonar or other electronic gear to locate schools of fish. This method is not only expensive in terms of the equipment required but may also involve substantial lengths of time at sea in order to locate the desired number of fish.

Another method of attracting fish that is practiced in lure type fishing involves the incorporation of a chemical into the lure which will dissolve and give off bubbles which attract the attention of a fish. The purpose of these bubble emitting lures, whether the bubbles be oxygen as in U.S. Patents 2,383,246 and 2,968,886 or carbon dioxide as in U.S. Patent 2,055,841, is to attract the attention of the fish to the lure which is emitting the bubbles.

The disadvantage that is common to all known methods of fishing is the fact that, statistically, the chances that a large number of fish will be within a particular netting zone at a particular time are quite remote. This is more readily appreciated in connection with deep sea fishing where such vast areas of water are involved and the fish are in continual motion. Thus, the shortcomings of the prior art may be summed up, simply, as involving time and space. The time factor referring to the fact that the passage of a net through a fishing zone is extremely short and unless a large number of fish happen to be in the particular zone the catch will be very small which emphasizes the space factor that is, statistically, in favor of the fish.

Summary of the invention

The purpose of the invention is to virtually eliminate the time and space factors, above referred to, by providing a zone of water to which fish are attracted over an extended period of time.

The basic concept involved is the recognition that fish are strongly attracted to heavily oxygenated zones of water. This attraction is not merely the result of curiosity due to the bubbling movement in the water which would be ineffective to hold fish within the oxygenated zone for protracted periods of time. Rather, the fish are attracted to the oxygen, itself, and will congregate and remain in the immediate vicinity of the oxygen source.

The explanation of this behavior is not completely understood. It has, however, been demonstrated that when oxygen generators of the type disclosed in the above listed copending application are lowered into a body of water, large numbers of fish gather as close to the oxygen supply as possible with the larger fish crowding out the smaller fish which then take up a more remote position while still remaining as close as possible to the oxygen bubbles. Not only are the fish attracted to the oxygen but they remain so long as the oxygen supply continues.

The application of this method of attracting fish to commercial fishing operations is obvious when it is realized that oxygen generators of the type referred to in the copending application, above identified, can provide relatively inexpensive sources of oxygen for a period of up to two weeks.

When a large number of these oxygen generators are submerged within a zone of water and allowed to operate for an extended period not only will the fish in the immediate vicinity at the time the generators are submerged be attracted to the oxygenated zone but, also, all the fish that pass adjacent to this zone during the extended period of time, which may be up to two weeks, will also be attracted to the zone. Accordingly, rather than attempting to seek out fish and then herd or scare them into a net, it is merely necessary to lower a number of oxygen generators into a body of water and come back at a later date to net the fish that have been attracted to the oxygenated zone.

This method of fishing decreases greatly the time at sea for fishing boats and also allows one to more or less choose the area of the sea in which he will fish.

The advantage in being able to net fish which have passed through or near a particular zone during a two week period as compared to the relatively ephemeral time period involved in making a netting pass is obvious. Similarly, it is apperent that through the use of the fishing method herein disclosed fish which would otherwise be spread out over an extremely large area are brought together in a single netting zone.

In view of the foregoing it will be seen that the time and space factors discussed in connection with the prior art conventional fishing methods have been obviated.

Description of the drawing

The foregoing and other advantages will become more apparent from the following detailed description of one method of fishing in accordance with the invention when considered in conjunction with the drawing wherein:

FIGURE 1 is a cross-sectional view through an oxygenated zone of water, with parts in elevation; and FIGURE 2 is a top plan view of a body of water including the zone shown in FIGURE 1.

Description of the preferred embodiment

In FIGURE 1 is illustrated a zone of water 10 within which are submerged a plurality of oxygen generators 12 of the type disclosed in copending application Ser. No. 674,316 filed Oct. 10, 1967. Oxygen generators 12 may be connected to anchors 14, resting on the bottom 16 of a body of water 18 including zone 10, by flexible connectors 20 to position the generators at any desired depth below the water surface.

Marker buoys 22 may be appropriately positioned adjacent zone 10 by anchors 24 and lines 26 at the time the oxygen generators are positioned in a desired fishing location to mark the position of the oxygenated zone for a future netting operation.

The fish 28 that are attracted to oxygen bubbles 30 tend to get as close to the source as possible and when they are crowded out by other fish they congregate around the stream of rising bubbles.

The oxygenation of zone 10 by generators 12 is continued for any desired period of time to attract large numbers of fish into the zone after which time the fish may be netted by making a single pass through the zone. The netting operation is illustrated schematically in FIG. 2 wherein boats 32 are shown towing net 34 through the oxygenated zone. Inasmuch as the oxygen generators are very inexpensive the net may be passed above the level of the generators or, alternatively, if it is desired to recover the generators along with the additional fish which may be grouped immediately adjacent the generators, the net may be lowered to pick up the generators along with the fish. The connection between connectors 20 and the generators 12 may be a frangible one so that the generators may be broken away from the anchor lines by the forces imposed thereon by engagement with the net.

It will be appreciated by those skilled in the art that the invention herein disclosed fulfills the stated objects of the invention and provides a vastly superior method of fishing.

We claim:
1. A method of fishing in a body of water comprising, the steps of: generating and releasing substantially pure oxygen from a submerged location beneath a zone of water for upward passage therethrough to attract fish to said zone of water, and passing a net through said zone of water.
2. The method defined in claim 1 including as an initial step the placement of a plurality of anchored oxygen generators beneath said zone of water.
3. The method of fishing defined in claim 2 including the step of positioning marker buoys adjacent said zone.
4. A method of fishing in a body of water comprising, the steps of: transporting a vessel including a plurality of oxygen generators to a desired fishing zone, positioning the generators in a submerged location within said zone, positioning at least one marker adjacent said zone, transporting said vessel away from said zone, returning said vessel to said zone, and passing a net through said zone to net the fish attracted to the zone by the oxygen generators.

References Cited
UNITED STATES PATENTS

| | | | |
|---|---|---|---|
| 2,245,495 | 6/1941 | Pemble | 119—3 X |
| 2,864,195 | 12/1958 | Bachmann | 43—4.5 X |
| 3,320,928 | 5/1967 | Smith | 119—5 X |

WARNER H. CAMP, Primary Examiner